United States Patent [19]

Rasmussen

[11] Patent Number: 4,465,724
[45] Date of Patent: Aug. 14, 1984

[54] RETICULATE SHEET PRODUCT

[76] Inventor: Ole-Bendt Rasmussen, 7 Topstykket, 3460 Birkerod, Denmark

[21] Appl. No.: 522,675

[22] Filed: Aug. 12, 1983

Related U.S. Application Data

[60] Division of Ser. No. 372,034, Apr. 26, 1982, , which is a continuation of Ser. No. 134,551, Mar. 27, 1980, abandoned, which is a continuation of Ser. No. 928,457, Jul. 27, 1978, abandoned, which is a continuation of Ser. No. 681,531, Apr. 29, 1976, abandoned.

[51] Int. Cl.³ .............................................. B32B 5/12
[52] U.S. Cl. .................................. 428/109; 428/110; 428/120; 428/134; 428/136; 428/137
[58] Field of Search ............... 428/109, 110, 120, 134, 428/136, 137

[56] References Cited

U.S. PATENT DOCUMENTS

| | | | |
|---|---|---|---|
| 3,503,836 | 3/1970 | Rasmussen | 428/134 |
| 3,554,853 | 1/1971 | Mercer | 428/134 |
| 3,565,744 | 2/1971 | Rasmussen | 428/137 |
| 3,949,111 | 4/1976 | Pelletier | 428/109 |
| 4,049,857 | 9/1977 | Hammer | 428/136 |
| 4,207,375 | 6/1980 | Kim et al. | 428/134 |

Primary Examiner—William R. Dixon, Jr.
Attorney, Agent, or Firm—William J. Daniel

[57] ABSTRACT

An integrated reticulate structure comprising interconnected criss-crossing arrays of continuous or discontinuous filaments. The arrays are located in different layers and are mutually connected by flexible, generally strip-shaped links. Each link is integral with a filament in one array and with a filament in another array.

A method of manufacturing an integrated reticulate structure commencing by extruding a sheet in form of an adhesively connected assembly of one or more films and one or more arrays of ribs extending from at least one surface of each such film. To enable a formation of thin ribs and of a close spacing of the ribs there is preferably further coextruded a separating component between the ribs. The array(s) of ribs are subsequently intersected by a close system of parallel furrows which are formed through each film and through adjacent portions of the ribs, without interrupting the ribs; and if a separating component has been coextruded so as to fill the spaces between the ribs, this is removed, or the connections formed thereby are disrupted before or after the formation of the furrows.

2 Claims, 12 Drawing Figures

RETICULATE SHEET PRODUCT

This is a division of Ser. No. 372,034, filed Apr. 26, 1982, which was in turn a continuation of Ser. No. 134,551, filed Mar. 27, 1980, now abandoned, which was in turn a continuation of Ser. No. 928,457, filed July 27, 1978, now abandoned, which was in turn a continuation of Ser. No. 681,531, filed Apr. 29, 1976, now abandoned.

The present invention relates to an integral net or a reticulate product. In more particular the invention relates to an integral reticulate product derived from a film or sheet made by extrusion of polymeric materials.

Nets derived from a film or sheet or formed directly at the exit of an extrusion die are mainly used as reinforcement in paper articles or cheap textiles, e.g. in sanitary articles, paper cloth and heavy duty bags, but also as non-woven upholstery fabrics. They have also been suggested for use as window curtains, misquito nets, etc.

These known products, however, tend to be limited as to flexibility and shearability and consequently in their field of use due to the fact that the crossing filaments or strips of film all lie in the same plane and are rather firmly connected at the crossing points.

The sheet according to the invention is an integrated reticulate sheet made from at least one polymeric material comprising at least two arrays of filamentitious structures in crossing intersecting relationship which is characterized in that the arrays are lying in different planes parallel with one another and that substantially all the filamentitious structures of any array are bodily linked to a plurality of filamentitious structures of an adjacent crossing array by flexible links.

This structure gives a strong net with a high shearability combined with high flexibility, and possessing a high drapery effect. Consequently, the product has a broader field of use, e.g. as independent textiles and manners similar to unwoven fabrics. The flexible links are generally in filament-to-platelet form, and generally occur at regular intervals along the length of the filamentitious structure. The latter can advantageously, but not necessarily, be a continuous filament.

The filamentitious structure in one direction of the sheet may very conveniently have the form of lamellae, as this among other things imparts a soft, nappy surface to the product. By the word "lamellae" is meant ribbon-like strips with two surfaces and two edges, that is, with the two dimensions generally much greater than the third one. Most commonly these surfaces will make an angle with the plane of the sheet. In this case the links will conveniently form extensions of portions at one or both of the edges.

These lamellae which are arranged under an angle to the sheet may be continuous ribbons, but can also conveniently be discontinuous lengths assembled in rows in an overlapping relationship along the row like shingles or in "cup-in-cup" fashion.

When the lamellae form one or both surface layers of the sheet, an interesting effect can be achieved by overlapping the continuous ribbons or thin rows (assemblies) of discontinuous lamellae in entirety in shingle arrangement (as distinguished from the overlapping arrangement within each row). This is interesting, e.g. when the sheet is being used for bandages where a ventilating effect is advantageous or for tents or waterproof clothes where the ventilating effect should be combined with water-resistant properties.

While usually at least one layer of the sheet according to the invention will consist of lamellae arranged under an angle to the sheet surface at least one other layer will usually consist of ribbons or ribbonlike structures of which the major surfaces are generally substantially parallel to the sheet surface (although these ribbon surfaces may be very much deformed, e.g. by dragging a nap as will be further explained). The links will usually branch-off from a major surface of these ribbons or ribbon-like structures.

For the sake of simplicity and easy differentiation, the two kinds of arrays will hereinafter be referred to as the "lamellae" and the "horizontal ribbons", respectively. The horizontal ribbons will usually form a longitudinal direction and the lamellae a transverse direction, but it should be stated clearly that the arrangement of the arrays can have other configurations. For example, the lamellae may be running generally essentially in the longitudinal direction, and the horizontal ribbons may run transversely to them. Also, both arrays may run diagionally or one array may run longitudinally or transversely and the other one more or less diagonally.

The links may be of a material different from that of both arrays, most conveniently of a softer material. Ia may, e.g. in essence consist of an elastomer, while at least one of the arrays integral with the link may in essence consist of a crystalline polymer. They may also consist of the same material as one of the arrays, preferably but not necessarily of the same material as the horizontal ribbons depending on the production method, as will be described later.

However, the link should preferably be integral or interconnected with a portion of a lamella and a portion of a horizontal ribbon. Preferably, but not necessarily, each lamella is linked to each horizontal ribbon that crosses it.

The sheet of the invention will usually also comprise other elements in addition to the arrays of filamentitious structures with connecting links. Thus, it will normally further contain generally unattached or loosely attached polymer material in fiberlike form interspersed and parallel with the filamentitious structures in at least one of the arrays.

Furthermore, fiberlike portions may extending integrally from the filamentitious structures of an array at one or both surfaces to form a nap on the sheet. The sheet is not always a flat sheet, but can be shaped in a curved form.

Attention is drawn to a known sheet described, e.g. in British Patent Specification No. 1,171,111. This sheet comprises a transverse array of lamellae standing mainly perpendicular to the sheet plane and a plurality of tentacles drawn out from the edges of the lamellae and crossing the array of lamellae to form one direction of the sheet.

However, the longitudinal strength of this patent is limited due to its lack of integrity in the direction formed by the tentacles.

The invention also relates to a method for producing the above reticulate product and similar integrated reticular products. The method comprises the steps of forming from at least one polymer a sheet comprising at least one generally continuous film and at least on one side thereof an array of ribs, the film and the ribs being adhesively connected in the solid state of the material, and subsequently hereto producing in intersecting relationship with the array of ribs a system of generally parallel furrows in the film without interrupting the ribs.

The film is thereby converted to an array of filamentitious structures. If the furrows are continuous and truly parallel, the filamentitious structures will also become continous ribbons which are usually but not necessarily flat with their major surfaces parallel to the surface of the sheet. The grooves can, however, also be formed in other patterns, e.g. as a system of staggered dotted lines.

If flexible links are wanted, as in the product described in the above parts of this description, the furrows should be deep enough to extend into adjacent portions of the ribs, but without interrupting the latter. The rib portions remaining between the extensions of the furrows will thereby form links, the dimensions of which depend on the thickness of the rib portion and the space between the furrows.

The furrows are preferably rounded at their termination in the ribs. The ribbed sheet may comprise more than one of the above-mentioned films with extending ribs, e.g. two surface films connected through ribs, or two surface films and one film in the core with all three films connected through ribs. All such films in the sheet are usually converted to filaments or the like by formation of furrows. If high shearability is desired, the furrows should extend in depth into the adjacent portions of generally all of the ribs.

The furrows can be produced by a number of different methods, such as by cutting action (usually followed by stretching of the ribs to round the termination of the incision), by milling action, by grinding action, by heat-embossing (see below) or by manipulations in an extrusion die (see below). Therefore, in some cases the formation of furrows takes place by a simple incision, in some by mechanical removal of material, and in some by displacement of material from one portion of the sheet to another portion.

The ribbed sheet structure described above and used as a basis for the production of a reticular structure does not necessarily constitute the external surface structure of the sheet, but may be an internal structure in the sheet—or in other words, the sheet may further comprise material interspersed with the ribs and different from the material from which the ribs are formed, in such a manner that the interspersed material generally fills the spaces between the ribs.

The interspersed material can act as a protective agent, e.g. when the furrows are formed by heat-embossing. It can also be a separating component used to facilitate the formation of fine ribs (see below) and/or a material which is useful as a component in the final reticulate sheet. To achieve the reticulated structure, such connections existing between the ribs during the formation of the furrows, have to be subsequently disrupted, at least in part. Disruption also includes the possibility of dissolving the interspersed material out.

The sheet or portion thereof which forms the basis for the manufacture of the reticulated structure is conveniently manufactured by "lamellar sheet" extrusion. This is a type of coextrusion with rotating die parts which is e.g. described in the U.S. Pat. No. 3,565,744.

Basically, the "lamellar sheet" extrusion comprises the steps of coextruding a first array of filamentitious structures consisting of a polymer material in at least partly fluid state in juxtaposed relation with a second array of filamentitious structures consisting of at least partly fluid extrudable material, joining the arrays to form an at least partly fluid composite sheet, and shearing out the flows by a sidewise or lateral deflection, so that the structures progress through the die with their main direction inclined to (usually generally perpendicular to) the direction of flow. Usually the extrusion die is a circular die, the arrays of flows are circular arrays, the joined arrays form a tubular sheet, and the deflection is carried out by a torsion created through fluid frictional forces caused by a continual rotation of die parts.

As it will be explained in connection with the drawings, the interspersing and joining can take place in different ways either to produce continuous structures of the first component or to produce discontinuous structures of this component arranged in rows with an overlapping arrangement of the individual structures within each row. In connection with the present invention, the coextrusion also comprises the feature to provide the lamellar sheet with at least one continuous non-disruptable layer adapted to form adhesive bond with the lamellae of the first polymer material. To this end, steps are taken to extend the first array beyond the second array on at least one side of the second array, and merging the extending portions of the structures of the first array with one another into a layer. This feature will be further explained in connection with the drawings.

Before or after the formation of the furrows, the connections between structures of first component (i.e. connections formed by the second component) are disrupted either by mechanical separation of the first and second component, which should then be incompatible materials, or by splitting within the second component, or by dissolution or expansion of the latter, and the disruption may be promoted by including in the separating material a slipping agent, e.g. an oil which is homogeneously mixed into the separating component during the extrusion, but bleeds out on cooling.

The above-mentioned layer formed by merging of extending portions forms the film which is subjected to the formation of furrows—or at least it forms a ply thereof. Another ply of this film can be added by lamination if the layer formed by merging is a surface layer.

The use of the term "first component" does not intend to indicate that all portions hereof should consist of one and the same polymer material. On the contrary, there are often great advantages connected with a coextrusion of two or more plies of different materials to form the "first component". These materials must form an adhesively connected assembly in the solid state. The "second component" may also consist of two or more materials.

By a suitable arrangement of different plies used in the coextrusion of the "first component", it is easy to achieve that the film(s) and the ribs will consist of different material and/or to achieve that a portion of the ribs located adjacent to the film is produced from a polymer different from the polymer used for another portion of the ribs. When the mentioned adjacent portions are, generally speaking, converted into links while the other portion remains as an array of filaments or filament-like structures, these two elements of the final reticulated sheet will generally show different physical properties. Thus, the portion of the ribs adjacent to the film can be made softer than the other portion of the individual ribs, e.g. they can be made from an elastomer. The purpose for this composite construction is to increase the shear-ability and the tear propagation strength of the reticulate sheet.

As it will appear from the description below, the use of different plies of different material in the "first component" can also serve the purpose of determining the depth of the furrows in a precise manner. In order to secure the adhesive bonding between different plies in the "first component", there may be coextruded an intermediate polymer selected for adhesive purposes.

Very conveniently, the furrows can be formed by heat-embossing or the like. It is not necessary that all of the sheet be molten, but at least the portions of the sheet in which the furrows are formed must be maintained in at least partly molten state during this procedure.

Preferably, at least a first portion of the individual rib is made from a polymer which has higher melting range than the polymer material from which the film is made. This higher melting polymer is maintained solid during the embossment. It is thus easy to obtain the desired depth of the furrows.

If flexible links are desired, a second portion of each rib adjacent to the film is made from a polymer material which has a lower melting range than the material for the first mentioned higher melting first portion.

The film and the second portion of the rib can in that case be made from one and the same polymer material.

When the film is located generally at a surface of the sheet, the formation of furrows by heat-embossment or the like may comprise moving portions of the material away from the location where furrows are formed and dragging a nap therefrom. Thus, the surface parts of the sheet in which furrows are to be formed can be struck to bosses on a hot roller and pulled out from the sheet by means of this roller while cooling air is supplied for fiber formation.

If a nap is not desirable in connection with the formation of furrows, the latter can be formed internally in a middle film of the sheet. This can e.g. be achieved by stripe-formed stretching between grooved rollers which fit into each other (or, if furrows generally perpendicular to the advance direction are wanted, between rollers with generally axial bosses on the surfaces). During this stretching, the material to be split is weakened by being in molten or half-molten state, while the exterior layers of the sheet are solid.

When the extension of the embossment is determined by different melting ranges within the system of "first component" the melting range of "second component" must be kept suitably low. However, the limits of the embossment can, alternatively, be determined by a higher melting range of the "second component" compared to the melting range of the polymer from which the film is formed, and/or different melting ranges within a composite system of "second component".

Most conveniently the film will be transversely stretched before the embossing, which gives a dense array of longitudinal filaments, i.e. a finer pattern. Preferably, the longitudinal filaments can be oriented by finally stretching the sheet longitudinally.

If a surface layer (formed by the above-mentioned merging) of the sheet is laminated with a prefabricated film, this film may be longitudinally stretched before lamination and embossing. In this way the distance between adjacent lamellae is not increased and the lamellar surface of the final product remains dense. Suitable cooling should be applied to secure that the orientation in the applied film(s) will not be destroyed outside the strips of contact with the embossing device, e.g. a heated roller. The layers may be united solely by heat-pressure between embossed heated rollers, during the embossment process.

Very conveniently the links or linking strips may, as previously mentioned, be formed of a different material, e.g. a softer material than that of the two arrays. This means that the number of different channels in the manifold and the number of orifices in the extruder die increases. If the layer of the third material is laminated to, instead of coextruded with, the lamellar sheet, the construction of the above mentioned machine components is less complicated.

At any stage after the extrusion the "lamellar sheet" may be cleaved into two sheets. Preferably the lamellar sheet in that case is provided with a continuous layer of the third material on both surfaces and very conveniently the separating lamellar material forms a continuous layer in the cleaving zone, which preferably is the symmetric plane of the sheet.

The cleaving of the sheet can be effectuated in any known manner as described for example in the U.S. Pat. No. 3,673,291.

If the links in a product are to be oriented for increased strength, they may be stretched approximately in the direction through which they connect the arrays by giving the reticulated sheet a slight stretch over a brush, or pinroller, or comb, which gets a hold in substantially all lamellae. At the same time the links are heated by hot air. This method implies that the links are not in this case formed of an elastomer.

It has already been pointed out that each continuous layer can be divided into longitudinal filaments by cutting or the like instead of by embossment. This means that both arrays of crossing filaments or filmstrips as well as the links, if any, in this product may be of the same material or of materials with approximately equal melting range. However, it is still possible to choose materials with different properties, e.g. a softer material for the links.

If the division of the continuous layer is obtained by cutting, then each such layer must be a surface layer and the cutting may be effectuated by a fixed device with parallel blades which are provided with distance gauging means to control the depth of the cuts.

The cutting blade may also be rotating and provided with pins or blades that may be arranged in staggered relation on it, a technique which is advantageous especially when very narrow stripes are to be obtained.

In another embodiment of the invention, the furrows are formed or at least initiated during the "lamellar sheet extrusion" by passing the film with adjacent portions of the ribs through a comb intersecting the array of ribs. Separating material may be ploughed into the film by the teeth of the comb.

In a modification of the embodiment, the "lamellar extrusion" terminates in at least a partial shaping of the furrows by passage of the sheet through a profiled exit die orifice while the main direction of the ribs is angularly arranged with respect to the direction of flow.

The formation of the furrows initiated by combing may be completed by a subsequent stretching in solid state.

The invention will now be described in further detail with reference to the drawings in which.

Figure 1:
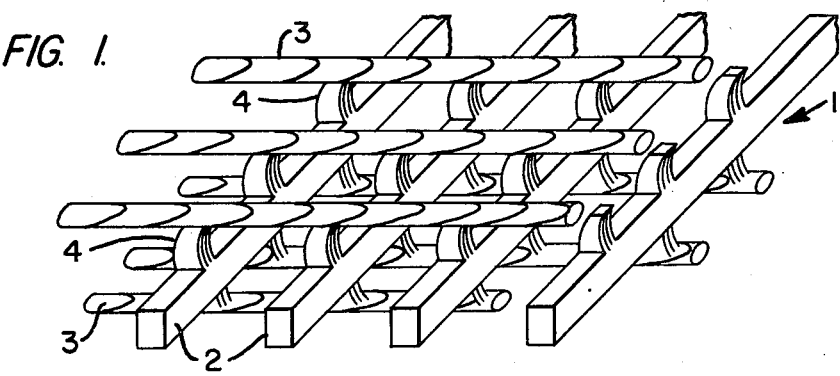
FIG. 1 shows an embodiment of a nonwoven fabric according to the invention.
Figure 2:
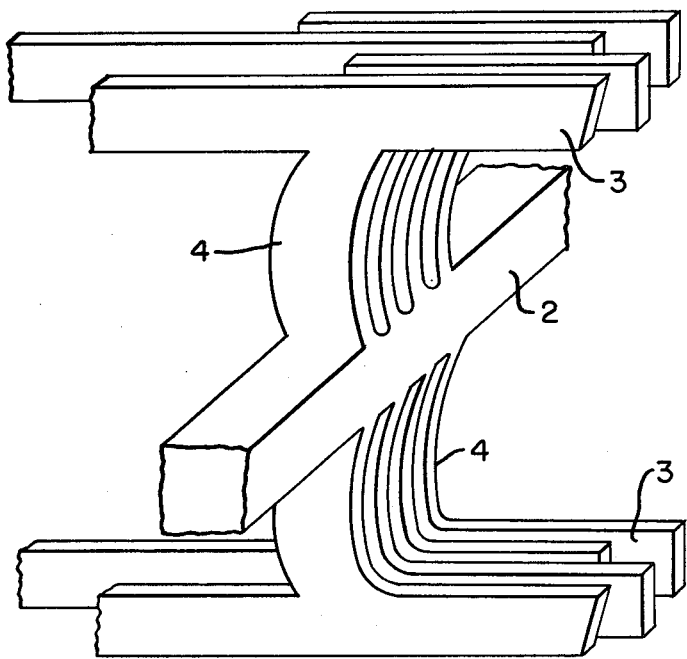
FIG. 2 is an enlargement of a part of the net in FIG. 1.

In FIG. 1 and FIG. 2, 1 is a non-woven reticulated fabric after being stretched in both directions. 2 are longitudinal filaments produced by dividing a continuous middle layer by embossing (heat-splitting), which embossing is carried out through outer layers of higher melting range but without dividing the outer layers. Filaments 2 will normally be flat ribbons with their surfaces parallel to the surface of the sheet, but are here shown as square formed. 3 are transversely running, discontinuous lamellae of highe melting polymer, shown very schematically. In actual fact they are bulky. The lamellae 3 comprise the above-mentioned outer layers. 4 are intermediary branches or linking strips of the same material as the longitudinal filaments 2. An enlargement of a "crossing point" of the net 1 is shown in FIG. 2 which (again schematically) indicates, that the lamellae 3 in this embodiment are discontinuous and overlapping by the product method explained below and may very well in fact overlap one another in shingle arrangement or usually even partly envelop one another in a cup-in-cup-like arrangement.

Figure 3:
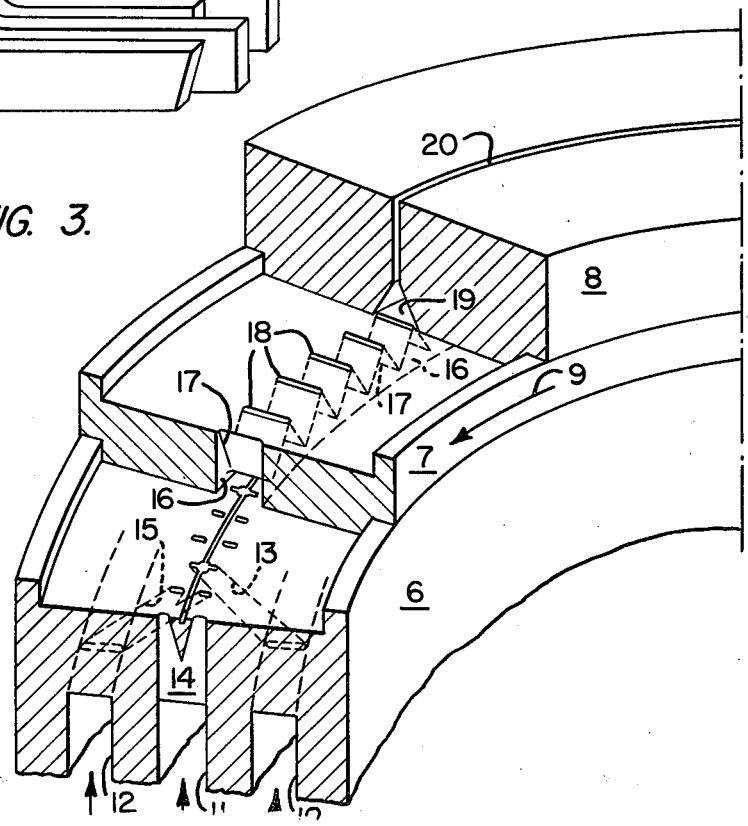
FIG. 3 shows in perspective view with displaced sections an extrusion die for use in carrying out a method according to the invention for producing the net shown in FIG. 1.

In the circular extrusion die shown in FIG. 3, 6 is a fixed inlet and manifold part, 7 a rotor to attenuate the flows by shear, and 8 a fixed part. The rotor rotates as indicated by the arrow 9, but the drive system herefor is not shown, neither are the bearings for the rotor nor the sealing means between the mentioned three main parts.

The inlet part comprises the three concentrical annular passageways 10, 11 and 12 through which polymer material is fed from three different extruders as indicated by the three arrows. The material for the higher melting lamelae designated 3 in FIGS. 1 and 2 is extruded through passageway 11, while the material for the branches or links and longitudinal filaments 4 and 2 respectively in FIGS. 1 and 2 is extruded through passageway 10 and a separating (protective) material—a material to be lached out, or disrupted to split fibers, or broken away from the other two materials—is extruded through passageway 12.

The materials extruded through passageways 11 and 10 must be compatible polymers. The two together form what in the foregoing was called the "first component", while the material extruded through passageway 12 is what was called the "second component".

Each of the three annular passageways 10, 11 and 12 terminates in a rather close circular array of extrusion channels, of which only one set of each array is shown, namely 13 from passageway 10, 14 from passageway 11 and 15 from passageway 12. The channels in the three arrays gradually intersperse with one another and gradually come together along a common annular locus, as indicated. They discharge three interspersed materials in a collecting chamber 16.

Figure 4:
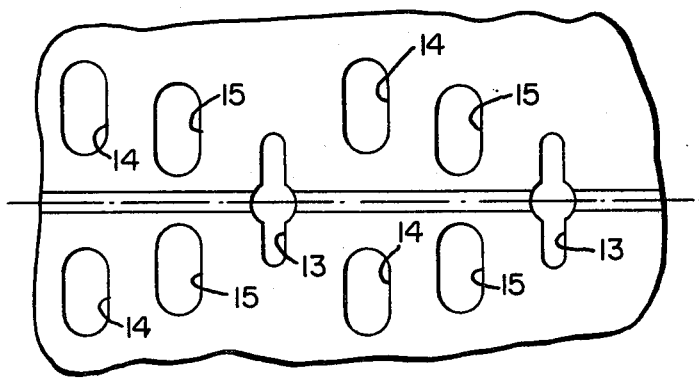
FIG. 4 shows a detail of FIG. 3.

The internal orifice through which the three materials are extruded from the channels into the collecting chamber 16 form a pattern which—together with the flow properties of the materials—determines the configuration of the extruded sheet. This pattern is shown in more detail in FIG. 4. For the sake of simplicity, this shows the row of orifices rectilinearly, but it is in fact a circular or annular row. The reference numbers for these orifices are the same as those for the corresponding channels, namely 14 for the orifices through which the higher melting material is extruded, 13 for those through which the lower melting material for longitudinal filaments and links is extruded, and 15 for the separating components. The channels 14 and 15 are divided into dual orifices to extrude on both sides of the middle zone. A rather shallow groove 16 connects the middle portions of orifices 13 with one another to secure that the material extruded through 13 will be merved into a continuous middle film by the shear established by the rotation.

In the rotor 7 the chamber 16 separates into a circular array of passageways 17 terminating in a second row of internal orifices 18, which open into a second annular collecting chamber 19 formed at the entrance to the exit part 8. This chamber leads directly into the narrow annular exit slot 20.

The extrusion materials flow in continuous streams into the first collecting chamber 16. Due to the rotation of chamber 16 these continous streams become attenuated and form "screws" or helica lines almost perpendicular to the die axis or general extrusion direction. Viewed in cross-section taken almost across the screw lines, the material will be arranged in a structure closely resembling that of the final extruded product—see FIG. 5—although the individual streams are at this earlier stage much coarser.

While entering into the passageways 17, the streams are divided by the partitions which form these passageways, and are hereby laid into elongated segments. This division takes place generally along their lengths. The materials will now form a new array of streams, in which the segments of different materials are interspersed with one another in a row following the length of the new streams, while their main direction starts transverse to their direction of flow. However, during the flow through the passageways 17 the main direction of the segments will change towards the direction of flow, and the segments will hereby form the above mentioned shingle-like or rather cup-in-cup-like arrangement.

The arrays of segmented streams will join in to a tubular fluid sheet in the second collecting chamber, at the same time as the torsion effectuated by the rotation of rotor 7 further attenuates the materials so that the segment becomes longer and thinner, and arranges the rows as screw lines—generally almost perpendicular to the axis of the die. The sheet is extruded generally in this form. Nonattenuation during the "broad side" flow through the exit will lead to wider lamellae and is generally not desirable, for which reason the distance from chamber 19 to exit marked 20 is made rather short.

Figure 5:
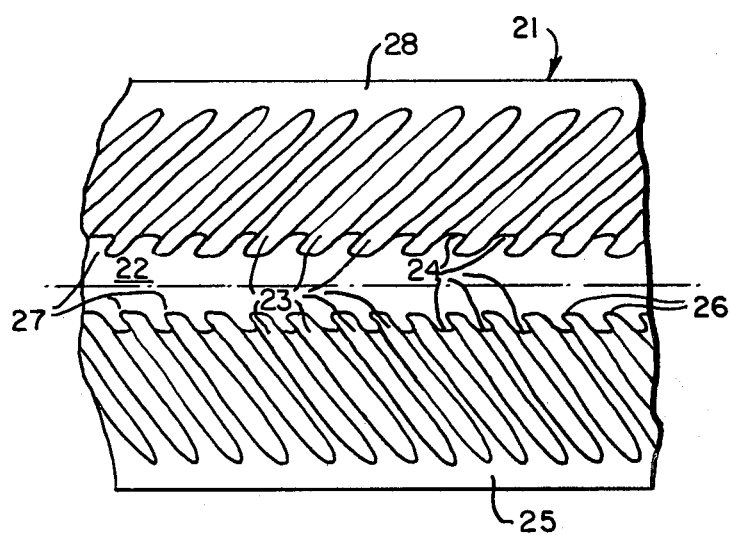
FIG. 5 shows in large magnification a cross-section of raw-sheet produced by means of the die shown in FIG. 3 before being treated to form the product shown in FIG. 1.

In FIG. 5 is shown the raw-sheet 21 from which the product of FIG. 1 is formed by stretching and heat splitting. 22 is a continuous layer of the lower melting polymer formed from the orifices 13 and slot 16 in the manifold of FIG. 3. 23 are lamellae of separating material formed from the orifices 15, and 24 are lamellae of the higher melting polymer formed from the orifices 14. The lamellae 24 fuse together to form a surface layer or skin 25 on both sides of the raw-sheet. The surface layers 25 are later peeled off and serve to avoid indefinite attenuation of portions remaining in the final product. The separating lamellae 23 project as at 26 into the continuous layer 22 to create extensions 27 from layer 22 which extensions will ultimately appear as links in the final product.

Figure 6:
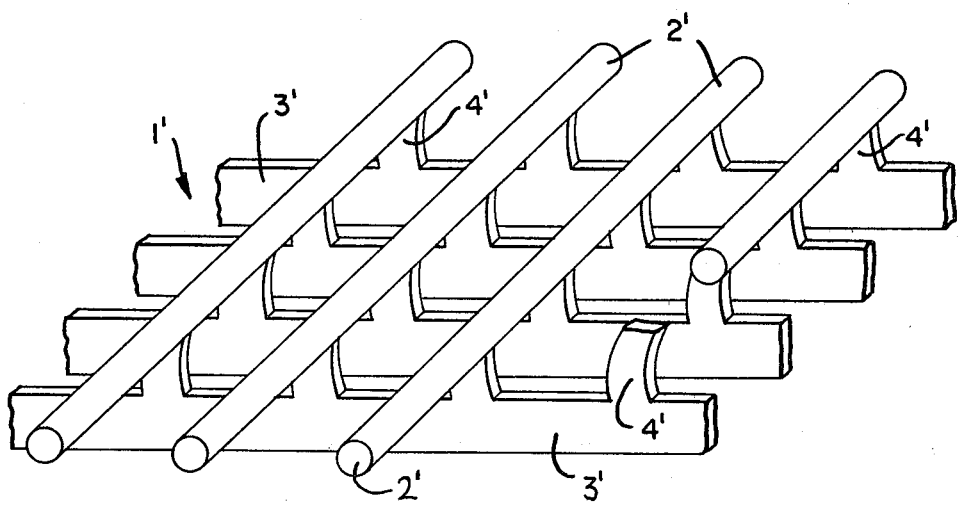
FIG. 6 shows another embodiment of a non-woven fabric according to the invention.

In FIG. 6, 1 reticulated non-woven fabric representing a simplified version of the embodiment of FIG. 1 (and using prime numerical designations for corresponding parts) with transverse, continuous lamellae 3' of the higher melting polymer and longitudinal filaments 2' of a lower melting polymer. The two arrays are linked at their "crossing points" by intermediary branches or linking strips 4' also of a lower melting polymer.

The longitudinal filaments 2' are shown as almost circular structures. However, although this is a possibility, it will normally be more practical to shape these filaments as relatively flat (ribbon-like) structures with their major surfaces generally parallel to the surface of the overall sheet. A knot may be formed at the edges of these ribbons.

Figure 7:
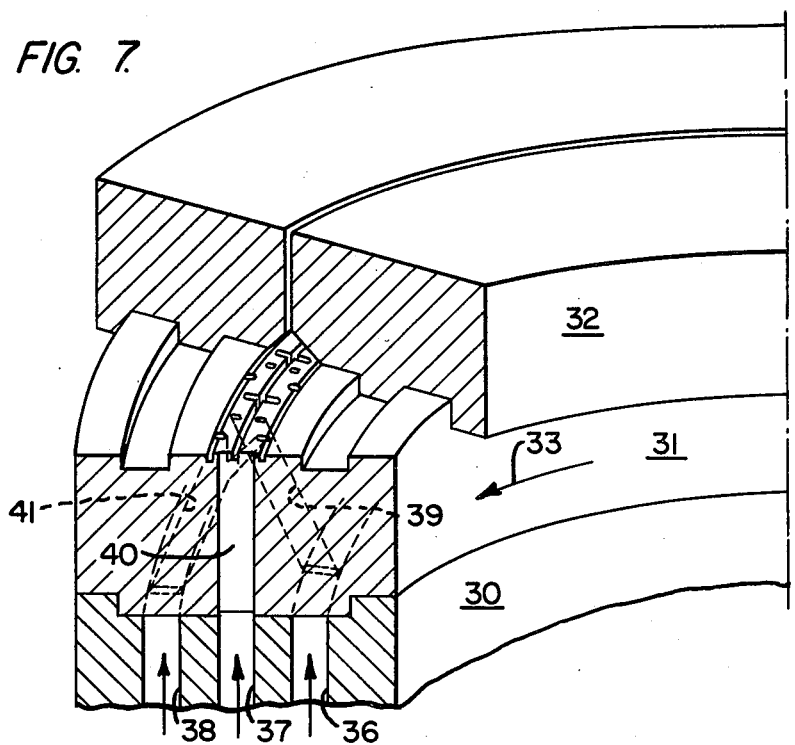
FIG. 7 shows in perspective view with displaced sections an extrusion die for use in carrying out another method according to the invention for producing the product shown in FIG. 5.

The raw-sheet for this structure is formed by means of the circular extrusion die shown in FIG. 7, of which 30 is a fixed inlet part, 31 a rotating manifold part and 32 is fixed exit part. The rotation is indicated by the arrow 33.

This construction differs from that of FIG. 3 basically in that the whole manifold system is revolving so that the continuous flows of the materials are extruded directly into a final collecting chamber immediately before the exit slot. The advantage of this system is that the streams maintain their continuity, while a drawback for finer textile purposes is that the attenuation is much less for a given speed of rotation, since there is only one stage of shear action (torsion).

Figure 8:
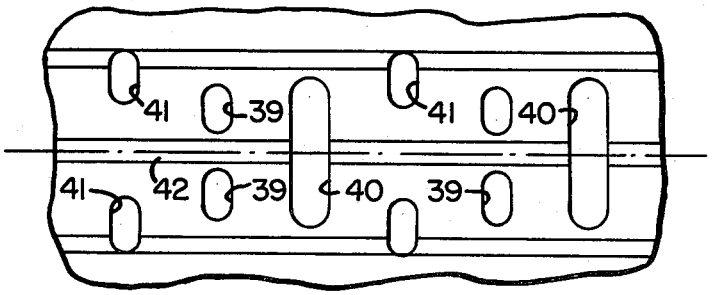
FIG. 8 shows a detail of FIG. 7.

Explained in more detail, the same three different materials as in the FIG. 3 embodiment are fed through three different annular passageways 36, 37 and 38 terminating in three arrays of channels 39, 40 and 41 respectively. These channels intersperse the flows or streams with one another and end in a circular row of internal orifices—see FIG. 8 in which for the sake of simplicity the row is shown rectinlinearly. The internal orifices are numbered the same as the corresponding channels. 42 is a shallow groove leading a separating material from the orifices 40 to form a continuous midlayer to promote the later cleaving of the product. 39 are orifices for the higher melting material, forming the transverse lamellae 33 and kept apart by the separating material from the orifices 40.

The lower melting point polymer (compatible with the higher melting) is conducted through the orifices 41 and shallow grooves 43 are lading these materials to form continuous surface layers. The orifices 41 and 39 are not totally staggered so that the lamellae of the separating materials also extend into the surface layers to a certain depth, as shown in FIG. 9.

Figure 9:
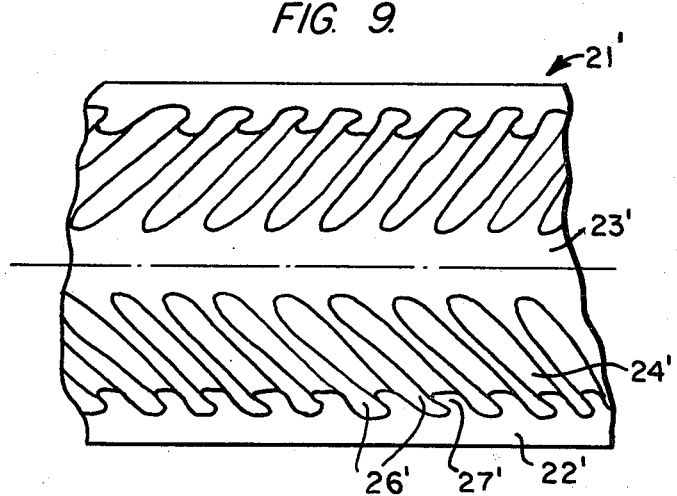
FIG. 9 shows in large magnification a cross-section of the raw-sheet produced by means of the die shown in FIG. 7 before being treated to form the product shown in FIG. 6.
Figure 10:
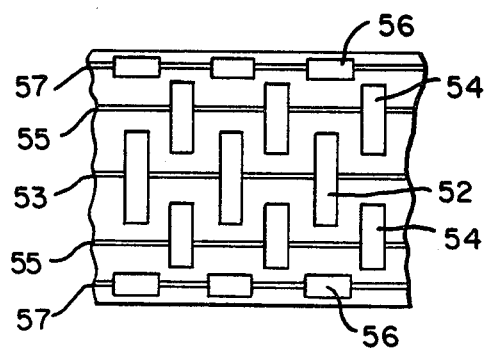
FIG. 10 shows part of a die part analogous to those of FIG. 4 and FIG. 8 for use in carrying out a third method according to the invention.

FIG. 9 shows the raw-sheet 21' derived from the manifold 18 and from which the product 14 is formed. This raw-sheet is similar to FIG. 5 of the first embodiment and prime designations are applied to similar materials. 23' is the continuous midlayer of the separating material and 26' the extensions of the same material are lamellae-like in ths case and are formed from the orifices 40 and groove 42. 24' is the lamellae of a higher melting polymer formed from the orifices 39 and forming the transverse filaments or lamellae 3' in the final product. 22' is the surface layer of a lower melting polymer that is divided into longitudinal filaments 2' by embossing by heat pressure. The separating material extensions 26' extend into the surface layer 29 to form parts 27' that after embossing constitute the links 4' of mainly lower melting polymer. In actual fact the material in the linking area changes gradually from pure lower melting to pure higher melting polymer, but for the sake of clarity the change is indicated with a distinct line. In FIG. 10 is shown a different arrangement of orifices from those seen in FIGS. 4 and 8 for forming a further embodiment of material, such row of orifices being actually circular but for the sake of simplicity shown as rectilinear. From orifices 52, 54 and 56 material is conducted to form the raw-sheet 58 of FIG. 11 and FIG. 12, as shallow grooves 53, 55 and 57 respectively lead the materials from the orifices to form the continuous layers. The orifices are shown rectangular but are in fact formed with rounded edges.

Figure 11:
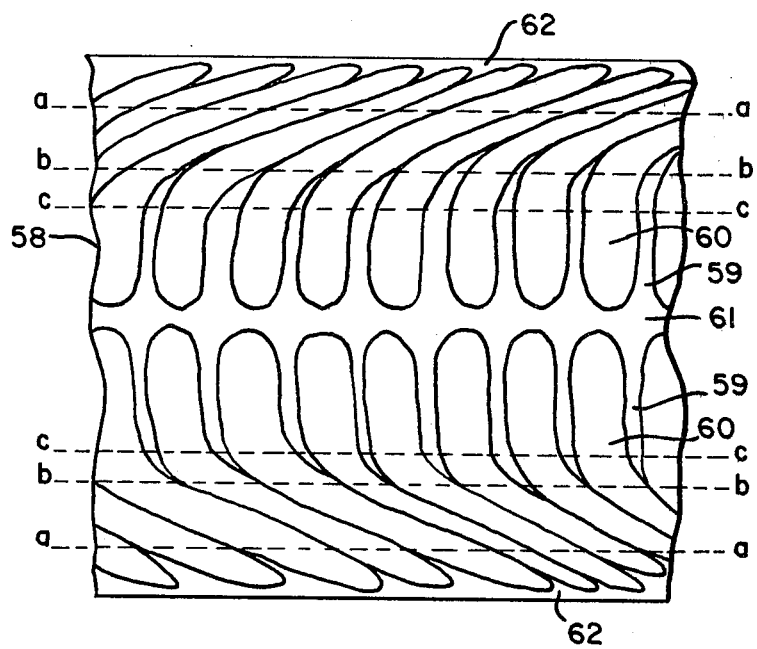
FIG. 11 shows in large magnification a raw-film produced by the die part of FIG. 10 before being treated to form a non-woven fabric and seen along X—X of FIG. 12.
Figure 12:
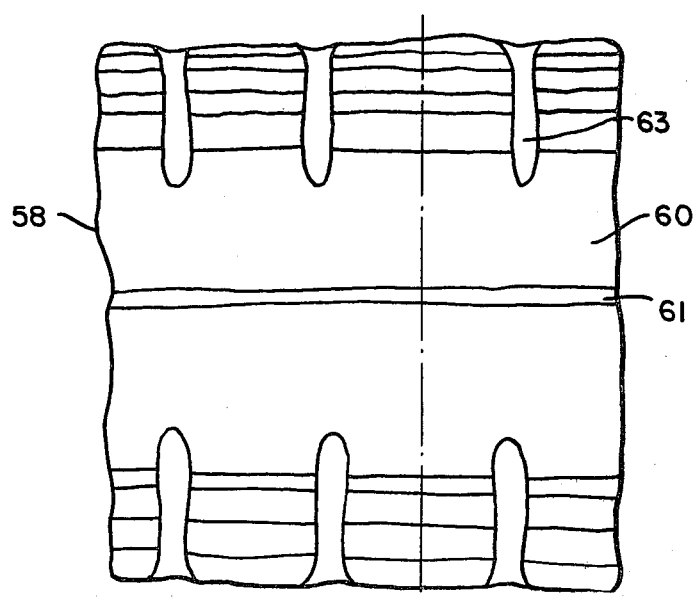
FIG. 12 is a cross-section of the sheet along IX—IX of FIG. 11.

In FIG. 11, 58 is the raw-sheet seen along the line IX—IX of FIG. 12 and in FIG. 12 seen along the line X—X of FIG. 11.

From the orifices 53 a separating material forms lamellae 59 between he lamellae 60 formed from the orifices 54. The groove 53 leads to the separating material to form a continuous midlayer 61 that facilitates the later cleaving of the sheet into two halves. The groove 55 leads the lamellae 60 of polymer material from the orifices 54 to fuse together in zones between the lines b—b and c—c approximately. From the orifices 56 a separating material forms a surface layer 62 that again separates the fused-together lamellae down to the line c—c. The line a—a indicates the bottom of the furrows 63 that is combed into the surfaces at the exit of the extrusion die. The furrows contain a mixture of the polymer substance and the separating material. The zone between the lines a—a and b—b is combed as well as disruptable, and will in a split netlike structure represent flexible links between the lamellae and the longitudinal continuous filaments that is provided by the combing of the fused-together zone between b—b and c—c.

In FIG. 12, 43 is as mentioned above the furrows that extend down to the line a—a of FIG. 11.

It should be stated clearly that although the product in FIG. 1 with the discontinuous lamellae 3 is shown with the longitudinal filaments derived from the embossed layer in the middle and arrays of lamellae on both sides, it is possible by the method according to the invention to produce a product with the discontinuous lamellae as the mid-array and longitudinal filaments as outer arrays.

Also it should be stated that it is possible to produce a product by the method according to the invention where continuous lamellae like 3' of FIG. 6 form the two outer arrays with a mid-array of longitudinal filaments derived from an embossed layer.

The lamellae have further been described as rather thin ribbonlike strips. However, it should be stated here that the lamellae may have the broad part of approximately the same as the hgith, so that only the third dimension (i.e. the length) is generally much greater than the two other ones.

For textile purposes, the main portion by weight of the lamellae should preferably be thinner than 100 microns in the final product. In fact it is not difficult to achieve much finer lamellae, for example an average of 20 microns or even less.

The horizontal ribbons should be textile purposes prefera-ly be thinner than 100 microns, and also for these structures a thickness of 20 microns can easily be achieved in the final product. The width of the horizontal lamellae is generally in the range of between 0.2 to 2 mm.

If the film to be subjected to the formation of furrows is a surface film formed by lamellae sheet extrusion, and the flexible links are formed from lamellae portions relatively close to the wall of the exit slot, there exists a danger that these lamellae portions become too much attenuated during the flow through the exit slot and the immediately preceding collecting chamber. The counteract this attenuation, the distribution of separating component may be adjusted so that adjacent to the surface film there is extruded a comparatively high proportion of the material for the links, and a correspondingly low proportion of the separating component. This measure can particularly be effective when there is used a high content of separating component, such as for example 20–50% of the total film. What in reality this means is that the separating component is intended to remain in the final product in the form of additional filaments or filament-like structures.

In this manner the links can even be made thicker at the location where they branch off from the filaments formed from the surface film—as compared to their minimum thickness—whereby the best ratio between shearability and tear strength can be obtained.

If, alternatively, the film to be subjected to the formation of furrows is located in the middle, the adjacent lamellae portions would normally be thickest adjacent to this film without any need to take special measures.

EXAMPLE 1

A product like the unwoven fabric of FIG. 6.
The lamellae are of Nylon 66.
The longitudinal filaments and the links are of Nylon 6.
The separating component is of polypropylene.
The melting index of Nylon 6 is according to ASTM D 1238 by conditions K, while the melt indexes of Nylon 66 and the polypropylene are the same but at a temperature of 285° C.
Weight of raw-sheet is 600 g/m². 
Temperature of extrusion is 285° C.
The pitch circle diameter of the extrusion die is 121 mm, and the amount of orifices 135.
The manifold revolves with 60 r/m.
After embossing by heat-rollers, the sheet is cleaved and the former midlayer is stripped (peeled) off, while the lamellae of polypropylene remain in the product to prevent a later melting together of the lamellae of Nylon 66.

The sheet is repeatedly stretched and disrupted between grooved rollers to a ratio of 2:1 of the width.

The surface film is heat-split in the longitudinal direction and provided with a napped surface by means of the method described in my British Patent Application No. 53268/74. The naps will be drawn out not least from the edges of the lamellae.

The final longitudinal stretching with ratio 2:1 must in this case take place in a heat-air-oven as a stretching over heat rollers will destroy the napped surface.

EXAMPLE 2

A product like the one shown in FIG. 1.
The lamellae, the filaments and the links as in Example 1.
The pitch circle diameter of the extrusion die is 121 mm and the amount of orifices is 192.
The row of partitions revolves with 60 r/m in front of the fixed manifold.
The product is not cleaved, but else treated like Example 1.

EXAMPLE 3

Lamellae of Nylon 6.
Surface material for longitudinal filaments of Nylon 6.
Separating material of polypropylene.
A manifold of the type shown in FIG. 6 and revolving with 16 r/m.
Temperature of extrusion: 235° C.
Thickness of raw-sheet: 1 mm.
The midlayer is cleaved and stripped (peeled) off.
Cross-stretching at a ratio of 2:1 by grooved rollers.
Raising of the lamellae by drawing of the sheet over a device with a rather distinct edge extending crosswise, and cutting the unlamelled surface with a fixed device with a row of parallel blades.
A final longitudinal stretching at a ratio of 2:1 over heat rollers.

EXAMPLE 4

The links are of a soft and ductile material, a copolymer of Nylon 6 and Nylon 66, with a melting range of approximately 180° C.
The lamellae are of Nylon 66.
The separating component is of polypropylene.
The longitudinal filaments are of Nylon 11.
To limit the numbers of channels in the manifold and orifices in the extrusion die, the Nylon 11 is applied in the form of a sheet that has been stretched at a ratio of 4:1
The lamellar sheet consisting of the three first mentioned components is extruded under conditions similar to those of Example 1 and cross-stretched in the same way.
After that the longitudinally stretched sheet of Nylon 11 is fed into embossed rollers together with the lamellar sheet.

In the following, there will be given other examples of suitable combinations of components, useful in connection with embossment technique.

(A)

for lamellae: nylon 6
for links: elastomer polyurethane for filaments: nylon 11 + Surlyn A (tradename for polyethylene ionomer)

separating component: polypropylene, or polyethylene, or polyethylene oxide (the latter to be leached out by water)

The said combination gives particularly high tear strength.

(B)

for lamellae: high density polyethylene for both links and filaments: a soft low density ethylene copolymer, e.g. copolymer with vinylacetate separating component: polyethylene oxide (to be leached out by water)

The major components here selected are particularly cheap. Also other polyolefins are suitable.

(C)

for lamellae: polyethyleneterephthalate (homopolymer)

for both links and filaments: polyethyleneterephthalate, a soft copolymer, e.g. with short links of polyethylene oxide separating components: like under A.

What is claimed is:

1. An integrated reticulate sheet made from at least one polymeric material comprising at least two arrays of discrete elongated filamentitious structures arranged in crossing relationship characterized in that the arrays lie in different layers which are generally parallel with one another and have their mutually facing sides physically spaced apart at their closest points in a direction generally perpendicular to said sheet, substantially all of the filamentitious structures of one of said arrays being each bodily linked to a plurality of the filamentitious structures of a next adjacent crossing array by means of discrete intervening flexible links, said links extending generally in said perpendicular direction and bridging the separation between adjacent arrays, each said link being integrally connected to their respective opposite ends with filamentitious structures from two next adjacent crossing arrays thereof, the extent of each such connection in the lengthwise direction of the contiguous filamentitious structure being substantially smaller than the length of that structure.

2. A reticulate sheet as in claim 1 wherein the length of each said link in said perpendicular direction exceeds the width and thickness thereof.

* * * * *